March 1, 1927.   L. L. GAGNON   1,619,341
OPHTHALMIC LENS
Filed Aug. 10, 1925
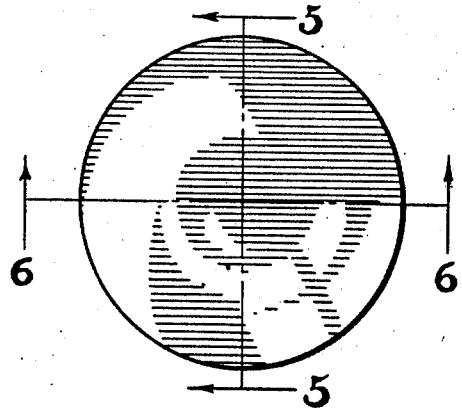
Fig. 1.
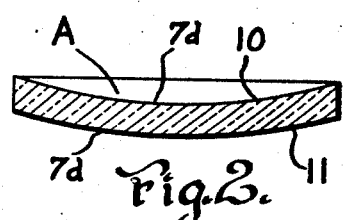
Fig. 2.
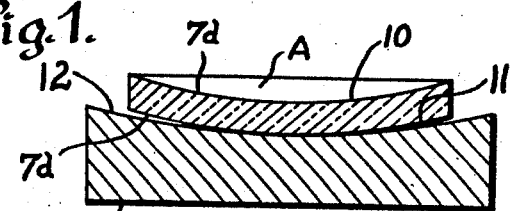
Fig. 3.
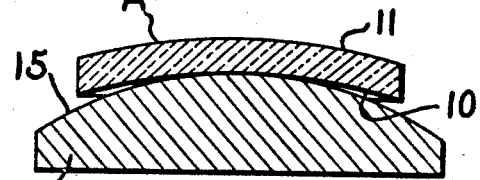
Fig. 4.
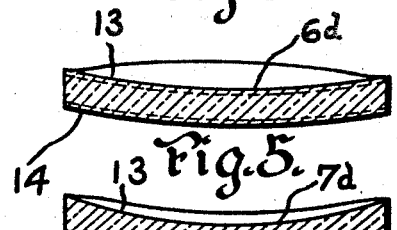
Fig. 5.
Fig. 6.
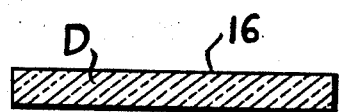
Fig. 7.
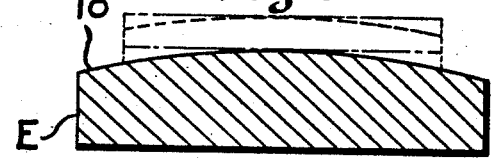
Fig. 8.
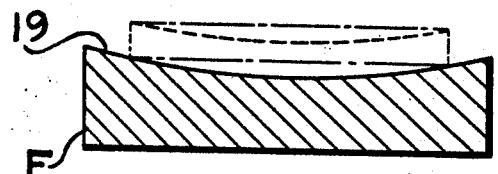
Fig. 9.
Inventor
Louis L. Gagnon.
By Harry H. Styll
Attorney Patented Mar. 1, 1927.

1,619,341

UNITED STATES PATENT OFFICE.

LOUIS L. GAGNON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed August 10, 1925. Serial No. 49,285.

The present invention relates to the manufacture of ophthalmic lenses, and more particularly to an improved method of making lenses of that type which, when completed, are formed with a concave or convex surface having different curves in at least two meridians, such for instance as a toric lens.

Because of the various difficulties encountered in the rough grinding and polishing of concave toric lens surfaces and the accurate and expensive machines required for accomplishing this purpose, I have provided a method to be more fully hereinafter described, which will overcome these difficulties and which will permit partially finished concave toric blanks to be simply and cheaply made.

Prior to the present invention there has been produced a method for making such a lens, which consists in first preparing a glass blank provided with a concave ground and polished spherical surface on one side and a convex toric surface on the opposite side, placing the concave spherical surface of the blank upon a mold having a convex toric surface and then heating the blank sufficiently to cause it to drop into contact with and conform to the surface of the mold. The difficulty with this method, however, is that the concave toric surface which is being formed, comes into contact with the mold, with the result that it is liable to become injured due to the effect of the mold upon the lens surface and after the concave toric surface has been formed it must not only be polished but also ground to remove the scale and mold marks.

Moreover in carrying out the above method it is necessary to first provide a glass blank having one spherical surface and one toric surface before the blank is ready to be molded. This preparing of the blank for molding necessitates the expenditure of considerably time and labor and it is, therefore, one of the purposes of my invention to reduce the cost of, and the time necessary to prepare a blank from which a lens having a concave toric surface may be molded by employing in conjunction with my process a blank having both surfaces thereof similarly formed.

It is also the purpose of my invention to provide a process by the use of which I can take a glass blank having similarly formed concave and convex spherical surfaces and, by the action of heat dropping the said blank whereby to change the spherical surfaces to toric surfaces.

Generally speaking, my invention consists in first preparing a glass blank having similarly formed non-toric surfaces, placing this blank on a mold or block having a toric surface and then, by the action of heat causing the blank to drop and conform to the curvature of the mold surface with the result that the non-toric surfaces will be changed to toric form. The blank is then removed from the mold and one of the toric surfaces subsequently removed.

One of the principal objects of my invention is to produce a process for molding lenses of the character stated, wherein after the lens has been finished the toric surface thereof which is to be retained, will not have been affected or injured during the molding operation, thereby eliminating any necessity for any after grinding or polishing.

It is also an object of the present invention to mold a blank of this character in such a manner that during the making thereof, the toric surface which is to be retained, will at no time come into contact with the mold.

A still further object of my invention is to provide such a blank which may be easily and cheaply produced and from which the optician can readily finish the required lens without any difficulty.

In the drawings forming a part of this application:

Figure 1 is a plan view of a finished lens produced by means of my improved process.

Fig. 2 is a transverse sectional view of a blank before it is placed on the mold or block.

Fig. 3 is a similar view showing the blank in position on a block having a concave upper surface.

Fig. 4 is a view showing the lens in position on a block having a convex upper surface.

Fig. 5 is a view taken on line 5—5 of Figure 1.

Fig. 6 is a view taken on line 6—6 of Figure 1.

Figures 7, 8 and 9 show a slight modification of my invention.

In carrying out my improved process and referring to the accompanying drawings, especially to Figures 1, 2 and 3, I first form as by molding or pressing, a blank of glass of the required refractive index, this blank being indicated by A, and having a concave spherical surface 10 and a convex spherical surface 11 both of which may be considered as having a curvature of 7 diopters or 7D. Both of these spherical surfaces may be ground and polished or in other words completely finished before the blank is placed in the mold while again, it may be found more desirable to finish only that surface which is to be retained after the blank has been molded.

When it is desired to form a concave toric surface, I employ a mold or block B having the upper smooth concave toric surface 12, the curvature of the longitudinal meridian of which may for the purpose of illustration be considered as 7 diopters, while the curvature of the transverse meridian of this surface may be 6 diopters.

The blank A is then placed on the mold B, as shown in Figure 3, with its convex surface 11 in contact with the toric surface 12 of the mold. The said mold, together with the blank is then placed in a suitable furnace and the blank heated sufficiently to allow it to soften whereupon it will drop into contact with the mold surface 12 and cause the concave and convex spherical surfaces 10 and 11 of the said blank to conform to the curvature of the concave toric surface of the mold.

This dropping operation will alter or modify the whole shape of the lens blank and the curvatures of the surfaces 10 and 11 will be altered to those as shown in Figures 5 and 6, in which the said surfaces 10 and 11 having conformed to the curves of the mold surface 12 will be changed to toric surfaces 13 and 14 respectively, each of said surfaces having its longitudinal meridian on a 7 diopter curve and its transverse on a 6 diopter curve. The blank is then removed from the mold or block and the convex toric surface thereof subsequently removed after which this surface is ground and polished to form a finished lens.

The concave spherical surface 10 of the blank A having been both ground and polished before having been placed in the mold, it does at no time come into contact therewith during the dropping operation with the result that the finished concave toric surface 13, is in no way injured during the dropping thereof so that after the blank is removed from the mold no further grinding or polishing of this surface is necessary. By placing a spherical surface on both sides of my blank I gain many practical advantages and avoid the distortion difficulties present in prior art procedures. In the first place the surfaces of the blank have a curvature which is the same curvature as one meridian of the toric surface which is to be placed on the blank. This insures that there will be no distortion whatever in one meridian when the blank is being dropped under heat and that the distortion in the other meridian will be reduced to a minimum because the curvature on the blank very closely approximates the curvature of the other meridian of the toric surface allowing a minimum amount of distance for the surfaces to drop down to conform to the toric surface of the block. The blank being made in this way to so closely approximate the curvature of the block it is believed less heat will be required to cause the lens blank to drop and the surface of the blank coming in contact with the toric block will be a much better surface than one in which the blank has been dropped through a greater distance reducing the work necessary to finish the surface that is to come in contact with the toric block to a minimum. In fact, in some cases it will only be necessary to slightly polish the said surface. From the foregoing it will be seen that my procedure reduces the distortion to a minimum and also the amount of work necessary in re-finishing the surfaces coming in contact with the block giving better surfaces and better refraction due to less distortion, and also reducing the strains in the glass to a minimum. While it is somewhat expensive to finish the two curves of the blank with spherical surfaces this is more than offset in the reduction of work necessary to produce toric surfaces, particularly a concave toric surface, which is a very difficult and expensive operation.

When it is desired to retain the convex toric surface 14 of the blank I use, as shown in Figure 4, a block C having an upper convex toric surface 15, the curvatures of which may be considered as being the same as those of the toric surface 12 of the block B. The lens blank A is then placed on this mold with its concave spherical surface 10 in contact therewith. The blank is then heated sufficiently whereupon it will drop into contact with and conform to the shape of the toric surface 15 with the result that the spherical surfaces 10 and 11 will be changed to toric form. The blank is then removed from the mold and the concave toric surface 13 subsequently removed. Because of the fact that the convex surface 11 was both ground and polished before the blank was placed on the mold and also because this surface 11 did not, at any time, come into contact therewith, no further grinding or polishing of the finished convex toric surface 14 is necessary.

Referring more particularly to Figures 7, 8 and 9 wherein I have shown a slight modification of my invention it will be seen that instead of employing a blank having concave and convex spherical surfaces I simply use a plano glass blank D, the surfaces 16 and 17 of which may be both ground and polished before the blank is placed in the mold. When it is desired to form a convex toric surface, the blank is placed on the toric surface 18 of the block E, while in the event that it is desired to retain the concave toric surface, the blank is placed on the concave toric surface 19 of the block F. The molding of the blank is accomplished in the same manner as described in connection with the preferred form disclosed hereinabove so that further detailed description is considered unnecessary.

It will, of course, be understood that while I have mentioned the curvatures of the blanks and the mold surfaces as being of certain diopters, this has been done merely for the purpose of illustration and that any desired curves may be used. I do not, therefore, wish to limit myself to the particular curves or diopters mentioned herein.

It can be readily appreciated from the above that by means of my improved method disclosed herein there is secured a considerable economy in the production of this type of lens and that both the cost of, and the time necessary to prepare a blank from which a lens of the character stated can be made has been greatly reduced.

Having thus described my invention, I claim:

1. The process of making an ophthalmic lens having a toric surface on one side thereof comprising making a glass blank with a spherical surface on each side thereof, the curvature of the spherical surface being the same as the curvature of one meridian of the desired toric surface, placing the shaped blank on a block having the desired toric surface, heating the blank on the block until the blank drops down to the shape of the block forming a surface on both sides of the blank of the same curvature as the block, the distortion in the glass blank due to the shaping having been reduced to a minimum as there had been no displacement in one meridian and a minimum displacement in the other meridian due to shaping both sides of the blank before heating to one meridian of the desired toric surface.

2. The process of making an ophthalmic lens having a toric surface on one side thereof comprising finishing one side of a glass blank to a spherical optical surface of the same power as the power of one meridian of the desired toric surface, shaping the other side of the blank to substantially the same spherical surface as the first side, and placing the side opposite to the side to have the toric surface on a block having the desired toric curvature and heating the blank on the block until the blank drops down to the curvature of the block, thereby changing the spherical surface of the side away from the block to a toric surface of the same curvature as the toric surface of the block with no displacement in one meridian and with a minimum displacement in the other due to the pre-shaping of the blank to a curvature that is the same as the curvature of one meridian of the block.

3. The process of making an ophthalmic lens having a toric surface on one side thereof comprising shaping a glass blank with a spherical surface on each side thereof the curvature of which is the same as one meridian of the desired toric surface, and placing the blank on a block having the desired toric surface, and heating the same until the blank drops down to the toric surface of the block, as and for the purpose described.

LOUIS L. GAGNON.